United States Patent [19]

Sudhakar et al.

[11] Patent Number: 5,624,547
[45] Date of Patent: Apr. 29, 1997

[54] PROCESS FOR PRETREATMENT OF HYDROCARBON OIL PRIOR TO HYDROCRACKING AND FLUID CATALYTIC CRACKING

[75] Inventors: Chakka Sudhakar, Fishkill; Paul O. Fritz, Newburgh, both of N.Y.; Carl J. Kjellson, Bakersfield, Calif.; Hua-Min Huang, Stormville; Gerald G. Sandford, Glenham, both of N.Y.

[73] Assignee: Texaco Inc., White Plains, N.Y.

[21] Appl. No.: 556,473

[22] Filed: Nov. 13, 1995

Related U.S. Application Data

[63] Continuation-in-part of Ser. No. 498,861, Jul. 6, 1995, Pat. No. 5,556,824, and Ser. No. 441,897, May 16, 1995, Pat. No. 5,529,968, which is a division of Ser. No. 287,979, Aug. 9, 1994, Pat. No. 5,462,651, said Ser. No. 498,861, Division of Ser. No. 122,986, Sep. 20, 1993, Pat. No. 5,449,452, and Ser. No. 425,547, Apr. 20, 1995, abandoned, which is a division of Ser. No. 189,992, Jan. 31, 1994, Pat. No. 5,435,907.

[51] Int. Cl.[6] ..................................................... C10G 45/00
[52] U.S. Cl. ........................ 208/89; 208/143; 208/216 PP
[58] Field of Search ........................... 208/143, 89, 216 R

[56] References Cited

U.S. PATENT DOCUMENTS

| | | | |
|---|---|---|---|
| 5,435,907 | 7/1995 | Sudkahar et al. | 208/143 |
| 5,449,452 | 9/1995 | Sudhaker et al. | 208/143 |
| 5,462,651 | 10/1995 | Sudhaker et al. | 208/143 |

*Primary Examiner*—Helane Myers
*Attorney, Agent, or Firm*—James L. Bailey; Henry H. Gibson; Harold J. Delhommer

[57] ABSTRACT

Disclosed is a process for pretreatment of hydrocarbon feed containing sulfur and nitrogen compounds and aromatics prior to hydrocracking or fluid catalytic cracking which comprises:

contacting said feedstock with a sulfided catalyst comprising a metal of non-noble Group VIII and Group VIB, and, optionally one or more elements selected from Group IIIA and Group VA of the Periodic Table on a carbon support consisting essentially of activated carbon, optionally on a carbon support treated with phosphorus, having a B.E.T. (Braunauer-Emmett Teller) surface area of at least 100 $m^2/g$ and an average Pore Diameter greater than 12Å and a Total Pore Volume greater than 0.3 cc/g.

76 Claims, No Drawings

PROCESS FOR PRETREATMENT OF HYDROCARBON OIL PRIOR TO HYDROCRACKING AND FLUID CATALYTIC CRACKING

This application is a continuation-in-part of allowed Ser. No. 08/441,897, filed May 16, 1995, U.S. Pat. No. 5,529,968, which is a divisional of Ser. No. 287,979, filed Aug. 9, 1994, U.S. Pat. No. 5,462,651. This application is also a continuation-in-part of Ser. No. 08/498,861, filed Jul. 6, 1995, U.S. Pat. No. 5,556,824, which is a divisional of Ser. No. 122,986, filed Sep. 20, 1993, U.S. Pat. No. 5,449,452 and of Ser. No. 08/425,547 filed Apr. 20, 1995, abandoned, which is a divisional of Ser. No. 189,992, filed Jan. 31, 1994, U.S. Pat. No. 5,435,907. This is also related to U.S. Pat. No. 5,472,595. This is also a continuation in part of U.S. Pat. No. 5,500,401, which is a divisional of U.S. Pat. No. 5,389,241.

FIELD OF THE INVENTION

This invention is related to the fields of catalytic hydrocracking and fluid catalytic cracking (FCC). More particularly it relates to the catalytic hydrotreatment of the hydrocarbon feed prior to these two processes. Still more particularly it relates to a process for lowering aromatics concentration and nitrogen prior to hydrocracking or fluid catalytic cracking in order to improve conversion and operability.

BACKGROUND OF THE INVENTION

Hydrocracking processes are used in the petroleum industry to convert gas oil range and heavier petroleum feedstocks into lighter petroleum products. Fluid catalytic cracking is also used to perform a similar function. The process selected to convert gas oil range petroleum feedstocks into lighter petroleum products will vary according to a number of factors such as the desired product mix from the process, the type of feedstock available for the process and the like. Such considerations are well known to those skilled in the art.

Hydrocracking

In general, hydrocracking processes comprise charging the gas oil range petroleum feedstock to one or more fixed bed hydrocracking zones containing a hydrocracking catalyst at hydrocracking conditions to produce a first hydrocracking zone product stream. The feed to the hydrocracker is generally hydrotreated to reduce the concentrations of sulfur nitrogen and aromatics, prior to its hydrocracking. The product stream from the first hydrocracking zone is typically charged to a fractionation zone where it is separated into a product stream which is recovered and passed to further processing to produce a variety of products such as gasoline, kerosene, jet fuel, diesel fuel and the like and a bottoms stream which is passed to a second fixed bed hydrocracking zone which contains a hydrocracking catalyst at hydrocracking conditions to produce a second hydrocracking zone product stream. The second hydrocracking zone product stream is then passed to cooling and charged to a fractionating zone which may be the same fractionating zone used to fractionate the product stream from the first hydrocracking zone. The separation of products in the fractionating zone is as discussed previously. It is necessary to cool the product stream from the second hydrocracking zone to a temperature suitable for fractionation and in typical processes of this type quantities of heavy hydrocarbonaceous materials accumulate in the bottoms stream from the second hydrocracking zone as a result of the recycling of the bottoms stream from the fractionating zone to the second hydrocracking zone, and eventually accumulate in amounts large enough that the heavy materials precipitate in the cooling zone. Previously, such heavy materials have been eliminated by withdrawing a portion of the product stream from the second hydrocracking zone and shipping it to a refinery with a fluid catalytic cracking unit for processing, or the like. The portion of the second hydrocracking zone product stream withdrawn is fixed by the amount of heavy material which must be removed to prevent precipitation of the heavy material in the cooling zone. Such remedies for this problem result in a reduction in the amount of lighter, more valuable hydrocarbon products recovered from the process and in considerable expense when the material removed is shipped to another refinery for additional processing. Accordingly, a continuing effort has been directed to the development of processes whereby substantially all the gas oil petroleum feedstocks charged to hydrocracking processes can be converted to lighter, more valuable petroleum products in the process.

FCC

In most modern FCC units the hot regenerated catalyst is added to the feed at the base of the riser reactor. The fluidization of the solid catalyst particles may be promoted with a lift gas.

Steam can be used in an amount equal to about 1–5 wt % of the hydrocarbon feed to promote mixing and atomization of the feedstock. Preheated charge stock (150°–375° C.) is mixed with hot catalyst (>650° C.) from the regenerator. The catalyst vaporizes and super heats the feed to the desired cracking temperature, usually 450°–600° C. During the upward passage of the catalyst and feed, the feed is cracked and coke deposits on the catalyst. The cracked products and coked catalyst exit the riser and enter a solid-gas separation system, e.g., a series of cyclones, at the top of the reactor vessel. The cracked hydrocarbon products are typically fractionated into a series of products, including gas, gasoline, light gas oil and heavy cycle gas oil. Some heavy cycle gas oil may be recycled to the reactor. The bottoms product, a "slurry oil", is conventionally allowed to settle. The solids portion of the settled product rich in catalyst particles may be recycled to the reactor.

The following references, which contain good overviews of FCC processes are incorporated herein by reference: U.S. Pat. No. 3,152,065 (Sharp et al.); U.S. Pat. No. 3,261,776 (Banman et al.); U.S. Pat. No. 3,654,140 (Griffel et al.); U.S. Pat. No. 3,812,029 (Snyder); U.S. Pat. No. 4,093,537; U.S. Pat. Nos. 4,118,337; 4,118,338; 4,218,306 (Gross et al.); U.S. Pat. No. 4,444,722 (Owen); U.S. Pat. No. 4,459,203 (Beech et al.); U.S. Pat. 4,639,308 (Lee); U.S. Pat. No. 4,675,099; 4,681,743 (Skraba) as well as in Venuto et al., Fluid Catalytic Cracking With Zeolite Catalysts, Marcel Dekker, Inc. (1979).

Hydrotreating

It is also known to treat hydrocarbon feedstocks employing hydrotreating catalysts to achieve hydrodesulfurization (HDS), hydrodenitrification or hydrodenitrogenation (HDN), carbon residue reduction (CRR), hydrogenation (HYD), hydrodeoxygenation (HDO), and hydrodemetallation (HDM). Some mild hydrocracking might also take place during these hydrotreating processes.

Hydrocracking catalysts are generally silica-alumina or zeolite based, and therefore are acidic. The nitrogen compounds and aromatics in the hydrocarbon feed can temporarily, as well as permanently deactivate these hydrocracking catalysts if they are not removed or reduced significantly prior to the hydrocracking operation, and therefore it is a general practice to hydrotreat the hydrocarbon feed prior to hydrocracking operations.

FCC catalysts are also generally silica-alumina or zeolite based, and are acidic. These catalysts are also deactivated or poisoned by nitrogen compounds and by some aromatics in the hydrocarbon feed.

The hydrocracking process and FCC process can be improved significantly by using a hydrotreating catalyst having high hydrodearomatization (HDAr) and HDN activities, to hydrotreat the feed prior to hydrocracking and FCC processes. One type of catalyst which is often used in the field of petroleum processing is a catalyst comprising Group VIB and Group VIII metal components on a refractory inorganic oxide, such as alumina. Hydrotreating catalysts within this description are described in U.S. Pat. No. 4,188,284 (Quick et al.); U.S. Pat. No. 4,224,144 (Hensley, Jr., et al.); U.S. Pat. No. 4,278,566 (Hensley, Jr., et al.); U.S. Pat. No. 4,306,965 (Hensley, Jr., et al.); U.S. Pat. No. 4,530,911 (Ryan, et al.); and U.S. Pat. No. 4,758,544 (Plesko, et al.).

Some hydrotreating catalysts include a zeolite component in addition to Group VIB and VIII metals. See, for example, U.S. Pat. Nos. 3,671,425; 3,716,475; 3,954,671; and U.S. Pat. No. 3,983,029 (White).

Many of the above-described hydrotreating catalysts saturate or convert some aromatics. However, a large amount of these aromatics still reaches the hydrocracker or FCCU catalysts, including polynuclear aromatics which are somewhat insoluble, and their accumulation results in the fouling of process equipment, such as heat exchangers and process lines, and also contribute to shortened catalyst life and higher processing temperatures, because in these reactors a major contributor to exothermic reactions is the saturation of the aromatics rings which must take place before the rings can be cracked.

Catalysts which have been disclosed which are supposed to possess improvements by allowing a greater level of denitrification are described in, for example, U.S. Pat. No. 4,548,920 (Thompson et al.); U.S. Pat. No. 5,071,805 (Winslow, et al.). In U.S. Pat. No. 4,716,142, (Laine et al.) written before the recent stricter environmental regulations, the process provides enhanced denitrification, but selectively produces aromatics.

U.S. Pat. No. 4,990,243 (Winslow, et al.) provides a layered catalyst system for hydrodenitrification of hydrocarbons.

In the art there have been attempts to further reduce aromatics in the hydrocarbon feed prior to its entry into the hydrocracker or FCCU. This is a particularly desirable goal recently, because aromatic hydrocarbons in fuels represent a source of atmospheric pollution and the laws governing the permissible amounts in gasoline and diesel oil have become stricter.

Problems associated with the formation of polycyclic aromatic compounds within hydrocracking reactions zones are addressed in U.S. Pat. No. 4,775,460 (Reno) by a feed pretreating sequence which comprises first contacting the feed with a metal-free alumina to produce the polycyclic compounds or their precursors, followed by contacting the feed with a bed of adsorbent.

In U.S. Pat. No. 4,961,839 (Stine et al.) the problems with the formation of polynuclear aromatic compounds are addressed by operating at high conversion rates with a high hydrogen concentration followed by a unique separation method. See also U.S. Pat. No. 5,120,427 (Stine, et al.).

In U.S. Pat. No. 5,110,444 (Haun et al.) middle distillate petroleum streams are hydrotreated to produce a low sulfur and low aromatic product in a process employing three reaction zones in series. Hydrogen flows between the reaction zones countercurrent to the hydrocarbons. Hydrogen sulfide is removed from effluent of the first two reaction zones by hydrogen stripping. The second and third reaction zones employ a sulfur-sensitive noble metal hydrogenation catalyst. Operating pressure increases and temperature decreases from the first to third reaction zones.

In U.S. Pat. No. 5,116,484 (Smegal) there is disclosed a process for the hydrogenation of nitrogen-containing hydrocarbons in a hydrocarbon feedstock by passing the hydrocarbons through a first catalyst bed containing a hydrotreating catalyst containing nickel and tungsten on an alumina support and thereafter passing hydrocarbons to a second catalyst bed.

There is a need in the art for a relatively simple, efficient process for hydrogenating a greater percentage of aromatics in the hydrocarbon feedstock before the hydrocarbons are fed into a hydrocracker or FCCU. If it were possible to obtain a significantly higher level of hydrogenation of all types of aromatics prior to hydrocracking or FCCU operations, there would be a number of important benefits with respect to hydrocracker and FCCU conversion and product quality. In addition, it would be extremely valuable if a catalyst which performed better with respect to hydrodearomatization were capable of simultaneously eliminating sulfur and nitrogen to a significant extent.

SUMMARY OF THE INVENTION

In accordance with the foregoing the instant invention comprises a hydrotreating process and a catalyst composition, and variations thereof, for improved saturation of aromatics, including polynuclear aromatics, of a hydrocarbon oil feedstock prior to hydrocracking or FCCU operations which comprises:

pretreating said feedstock prior to hydrocracking or FCCU operations by contacting said feedstock with a sulfided catalyst comprising at least one metal of non-noble Group VIII and at least one metal of Group VIB and, optionally, one or more elements selected from Group IIIA or Group VA of the Periodic Table on a carbon support, the support consisting essentially of activated carbon, optionally treated with an element from Group VA, particularly phosphorus, and having a B.E.T. (Braunauer-Emmett Teller) surface area of at least 100 $m^2/g$, an average Pore Diameter greater than 12 Å and a Total Pore Volume greater than 0.3 cc/g.

DESCRIPTION OF THE INVENTION

The instant highly efficient process for pretreatment of hydrocarbon oil feedstock to hydrocrackers and FCCUs utilizes the carbon supported catalysts described in detail in U.S. Pat. No. 5,472,595 and in U.S. Pat. Nos. 5,462,651, 5,435,907, 5,389,241 and 5,449,452, assigned to Texaco Inc. The catalysts of U.S. Pat. No. 5,742, 595 and to allowed Ser. No. 08/287,825 and of U.S. Pat. No. 5,462,651 and U.S. Pat. No. 5,449,452 possess hydrodearomatization (HDAr) activities about twice as high as any available commercial hydrotreating catalysts.

The instant process, in addition to providing substantial hydrodesulfurization (HDN), hydrodenitrogenation (HDN), provides increased saturation of aromatics prior to hydrocracking and FCCU operations, resulting in the following important benefits with respect to conversion and product quality in a hydrocracker:

(i) Higher overall hydrocracking conversion,
(ii) Higher API gravity of the overall product and those of the individual product components, (iii) Lower boiling ranges of the products such as gasoline, diesel and heating oil, which contributes significantly toward the production of less polluting reformulated fuels, and (iv) Lower concentration of polynuclear aromatics, aromatics, sulfur, and nitrogen in product gasoline and diesel, which is extremely important, especially in markets such as California. In particular, the diesel product will have substantially higher cetane number.

Due to the improved saturation of aromatics in the hydrotreating reactor, the "operability" of the hydrocracking reactor would be improved significantly, particularly if the hydrocracking reactor operation is "delta T" (temperature difference within the catalyst bed) limited. Often the conversion in the hydrocracking reactor can be limited by the heat which is generated during the exothermic reactions that take place in the hydrocracker. A major contributor to the exothermic reactions is the saturation of the aromatic rings, which must take place before the rings can be cracked. The ability to saturate these rings prior to the hydrocracking operation allows for higher hydrocracking conversions, with less temperature rise across the bed, and thus alleviates or removes the "delta T" limitations, and improves the operability of the hydrocracking reactors. The productivity or throughput of the hydrocracker may also be significantly increased to make use of this improved operability, which will result in significant economic benefits.

Other benefits from improving the HDAr and HDN in the hydrotreatment reactor by the use of higher activity catalysts would be to increase the run length of the hydrotreater and therefore of the hydrocracker. In other words, this improves the utilization of both the units significantly. The economic benefits that can be realized from this benefit alone would be substantial.

Similarly in FCC units, lower aromatics concentration, together with significantly lowered nitrogen concentration of the hydrocarbon feed for the FCC unit would have a multitude of benefits including but not limited to:

(i) Higher overall FCC conversion, which is highly attractive economically, (ii) Lower concentration of polynuclear aromatics, sulfur, and nitrogen in product gasoline, diesel, and heating oil, (iii) Lower amounts of $NO_x$ during the FCC catalyst regeneration, lower coke make, etc.

Charge

The charge hydrocarbons which may be pretreated by the process of this invention are hydrocarbons generally heavier than kerosene. Typically the feedstock may have an ibp (initial boiling point) of at least 250° F. and typically 250° F.–650° F. Hydrocarbon feeds with ibp of >650° F. are also suitable.

The charge hydrocarbons include hydrocarbon oil feeds generally heavier than kerosene, including, but not limited to all atmospheric gas oils, all vacuum gas oils, residua and whole crude oils. Heavy naphtha is also suitable as a feed for the process of the instant invention, especially in a hydrocracking process wherein the heavy naphtha is converted to light naphtha. The above charge hydrocarbon feeds may be derived from petroleum, coal, shale, tar sands, oil sands, and other synthetic fuels, and mixtures thereof. Gas oils produced by thermal or catalytic cracking, for example, in an FCC unit, or in a delayed coking unit which are called "cycle gas oils" and "coker gas oils" are also included as feedstocks suitable for the process of the present invention.

These hydrocarbons heavier than kerosene may have an aromatics content as high as 90 vol %, typically 25 vol %–80 vol %, say 45 vol %. In addition to the undesirable aromatic content, they may contain other undesirables such as sulfur (0.01–6 wt %, typically 0.5–3.0 wt %) and nitrogen (0.001–2 wt %, typically 0.01–0.3 wt %). Hydrocarbon feeds containing greater than 0.5 wt % sulfur are preferred for the process of the present invention. Some hydrocarbon feeds such as those derived from coal, may contain oxygen in the form of organic oxygen containing compounds in addition to the sulfur, nitrogen and aromatics, in amount of 0.01–2 wt %. The charge may also contain metallic impurities such as vanadium, nickel and iron, of the order of 1 ppm to about 100 ppm by wt. A typical charge which may be treated by the process of this invention is shown in Table 1.

TABLE 1

Properties of Hydrocarbon Feed Mixture

Distillation using D #2887 Method

| | |
|---|---|
| IBP | 265° F. |
| 5% | 379° F. |
| 10% | 406° F. |
| 20% | 444° F. |
| 50% | 544° F. |
| 80% | 635° F. |
| 90% | 676° F. |
| 95% | 704° F. |
| FBP | 776° F. |
| API Gravity | 27.3° |
| S, wt. % | 1.19 |
| N, ppm wt | 1700 |
| Aromatics (wt %) (by Supercritical Fluid Chromatography, or SFC) | 45 |

Conditions

In the practice of the process of this invention, the hydrocarbon feedstock to be pretreated, along with hydrogen, may be admitted to the pretreatment catalyst bed at about 250° C.–450° C., preferably at a pressure of 200–3,000 psig, say 1,500 psig.

Gas mixtures wherein hydrogen is the major component, say higher than about 60% by volume, may be employed instead of pure hydrogen gas. LHSV (Liquid Hourly Space Velocity) based on catalyst volume may be 0.1–10, preferably 0.5–4, say about 2. The hydrogen flow rate may be 200–10,000 SCFB (standard cubic feet per barrel), preferably 1,000–6,000 SCFB, say 4,000 SCFB.

Reactor Systems:

The process of the present invention may be effected in any type of reactor system such as fixed bed reactor system, ebullated bed reactor system, fluidized bed reactor system, moving bed reactor system, slurry reactor system, and the like. In the case of fixed bed reactor system, the reaction zone may consist of one or more fixed bed reactors and may comprise a plurality of catalyst beds. It is preferred to use extrudates, pellets, pills, spheres or granules of the catalyst in a fixed bed reactor system. However, the finished catalysts of the present invention can be in any physical form described above, and also as powder.

The process of the present invention can be configured with one or more fixed bed reactors, and with the combination of co-current and counter-current flow of hydrogen and hydrocarbon feed to maximize the aromatics conversion. Furthermore, hydrogen sulfide and ammonia produced can be removed between the different beds of multiple catalyst beds or between reactors to further improve the aromatics saturation. Each catalyst bed in the reactor can be controlled at the required temperature to overcome the thermodynamic limitations and thus maximize the aromatics saturation. In general, any process configuration that is described in the literature or that is known to those skilled in the art may be used to practice the process of the present invention to maximize the aromatics saturation or conversion.

Catalysts-I

The catalysts used in the process of the instant invention are high activity hydrotreating catalysts disclosed in U.S. Pat. Nos. 5,435,907, 5,389,241, 5,449,452, 5,462,651, 5,472,595, 5,500,401, and pending Ser. No. 08/498,861, and Ser. No. 08/425,547, all of which are incorporated by reference herein in their entirety. Most of these catalysts possess hydrodearomatization (HDAr) activities about twice as high as currently available commercial catalysts and possess hydrodesulfurization (HDS) and hydrodenitrogenation (HDN) activities which are comparable or higher than those obtained with the best available commercial HDS/HDN catalysts.

Catalyst supports:

The supported catalysts of this invention are preferably prepared on an activated carbon support. All carbons with B.E.T. surface areas more than 100 $m^2/g$, derived from any raw material such as coal, wood and other ligno-cellulosic materials, peat, lignite, coconut shell, fruit pits, synthetic polymers, coke, petroleum pitch, coal tar pitch, etc., are suitable as catalyst supports for the catalysts of the present invention. Carbon is generally characterized as "activated" if it contains an intricate network of internal porosity arising from the activation process. The primary particles in these activated carbon materials are much larger than 5,000 Angstroms in diameter.

The activated carbon support used in the catalysts of this invention can exist in any physical form including, but not limited to powder, granules, pellets, pills, spheres, fibers, monolith, foams, or extrudates.

The carbon support may contain a small concentration of phosphorus, on the order of about 2 wt. % or less, as a consequence of its manufacturing process. It may also contain one or more refractory inorganic oxides as minor components, which may arise as a result of the carbon's inherent composition (ash), or as a result of using some binding material for forming (or shaping) the carbon material, total of these components of ash including the phosphorus being less than about 25 wt. %.

Commercially available activated carbons may be modified by suitable chemical and physical processes before using them as catalyst supports for the catalysts of the present invention. Suitable chemical treatments to modify the surface chemistry of the carbons can be any treatment which does not significantly alter the physical properties of the carbon such as its surface area, or its pore size distribution, but changes its surface chemical properties such as their acidity, basicity, surface oxygen containing groups and their concentrations, etc. Examples of such treatments to modify the surface chemistry of carbons are provided in "Chemistry and Physics of Carbon", Vol. 24, page 213- , Edited by Peter A. Thrower, Marcel Dekker, 1994, in the article entitled "Interfacial Chemistry and Electrochemistry of Carbon Surfaces", by L. R. Radovic and Carlos Leon y Leon. Examples of physical treatments to alter properties such as the surface area and pore size distribution of the carbons are available in "Chemistry and Physics of Carbon", Vol. 21, page 1- , Edited by Peter A. Thrower, Marcel Dekker, 1991, in the article entitled "Microporous Structures of Activated Carbons as revealed by Adsorption Methods", by F. Rodreguiz-Reinoso et al. Some physical treatments such as heating the carbon in air, inert atmosphere, or vacuum at high temperatures as high as 2000° C., alter the physical as well as the surface chemical properties of the carbons, and therefore are included as suitable carbon support pretreatments for the catalysts of the present invention.

The Total Surface Area (Braunauer-Emmett-Teller, B.E.T.) of the carbon support should be at least about 100 $m^2/g$, and typically between 100 $m^2/g$ and 2,000 $m^2/g$. The preferred range is between 600 and 1600 $m^2/g$. The Total Pore Volume (TPV) for nitrogen is at least about 0.3 cc/g, preferably 0.4–1.2 cc/g, say 0.8 cc/g. The Average Pore Diameter by nitrogen physisorption, is in the range of 12–100 Angstroms, preferably 16–50 Angstroms, say 25 Å. Preferably 20–80% of the total pore volume of the carbon support should exist in pores in the mesopore range (20–500 Å diameter).

Suitable commercially available carbon pellets, granules, or extrudates which may be used as catalyst supports in fixed beds in the practice of the process of this invention may include, but are not limited to:

A. A commercially available activated carbon known by the brand name, Nuchar BX-7530 carbon obtained from the Westvaco Company as ⅛" pellets, having a Braunauer-Emmett-Teller (BET) surface area of 1128 $m^2/g$, a nitrogen pore volume (TPV) of 0.82 cc/g (for nitrogen), Average Pore Diameter estimated using the Wheeler equation:

Average Pore Diameter (Å)=[40,000×TPV (cc/g)]/Surface Area ($m^2/g$), of 29.2 Å calculated from nitrogen physisorption data, an apparent bulk density of 0.37 g/cc and an ash content of less than 7 wt %.

B. The Atochem ACP carbon (of the Atochem Company) pellets (4 mm diameter) having a surface area (BET) of 997 $m^2/g$, a TPV of 0.59 cc/g (for nitrogen), Average Pore Diameter of 23.6 Å, and an apparent bulk density of 0.40 g/cc.

C. 3 mm (or other diameter) extrudate of RX Series brand (of Norit Company) activated carbon: BET Surface Area 1400 $m^2/g$; Total Pore Volume 0.8 cc/g; Average Pore Diameter estimated using the Wheeler equation Average Pore Diameter (Å)=[40,000×TPV (cc/g)]/Surface Area ($m^2/g$)

of 22.4 Angstroms;

Apparent Bulk Density 410 g/l; Ash Content 4 wt %; 3 mm (or 0.8 mm) particle diameter.

D. 0.8 mm or other diameter extrudate of RO Series brand (of Norit Company) activated carbon: BET Surface Area 1510 $m^2/g$; Total Pore Volume 0.98 cc/g; Average Pore Diameter 25.9 Angstroms; Apparent Bulk Density 400 g/l; Ash Content 6 wt %.

In a preferred embodiment the carbon support is a "phosphorus treated carbon", containing 0.1–10 wt % phosphorus, expressed as elemental phosphorus, but existing as phosphate or polyphosphate in the carbon support. This "phosphorus treated carbon" support is prepared by heat treating mixtures of activated carbon and one or more phosphorus compounds at temperatures between 450° C. and 1200° C.

Catalyst-II:

The desired hydrodearomatization, with simultaneous hydrodesulfurization, hydrodenitrogenation, hydrodeoxygenation, and possibly some mild hydrocracking of hydrocarbons according to this invention is accomplished by use of a catalyst prepared from the carbon support characterized by a B.E.T. surface area of at least about 100 $m^2/g$ up to about 2000 $m^2/g$, a Total Pore Volume of at least about 0.3 cc/g, and an average Pore Diameter of at least 12 Å which has deposited thereon 1–50 wt % of VIB metal, 0.1–15 wt % of non-noble Group VIII metal, optionally a Group IIIA element, and optionally, 0.01–10 wt % phosphorus. As stated, the catalysts of the present invention may also contain additional Group IIIA promoters, preferably boron, in an amount of 0.001% to 10 wt %, calculated as elemental boron based on the total catalyst weight, and in addition, the well known promoter fluoride, in an amount of 0.001% to 2 wt %. More than one promoter may be present in the final catalyst.

The catalytic metals may be deposited on the carbon, in the form of inorganic, organic or organometallic compounds of the meals, either sequentially or simultaneously, in any order, by various processes known in the art including incipient wetness impregnation, equilibrium adsorption etc., from aqueous or non-aqueous media, or from vapor phase using volatile compounds of the metals. The catalysts can also be prepared by solid state synthesis techniques such as, for example, grinding together the support and the metal compounds in a single step or in multiple steps, with suitable heat treatments. It is to be noted that in the as prepared catalysts, the catalytic metals exist as oxides or as partially decomposed or partially reacted metal compounds.

When aqueous solutions are used to deposit the catalytic metals on the support either individually or more than one at the same time, the pH values of the aqueous solutions may be adjusted to desired values before metals deposition. As is well known to those skilled in the art, the pH of an aqueous solution containing catalytic metals may need adjusting to a desired value before it is used for metals deposition on a catalyst support, in order to obtain optimum dispersion of metal compounds.

It is to be noted that the Cr, Mo, W, Ni, Fe and Co exist as oxides or as partially decomposed metal compounds which may be precursors to the oxides. The phosphorus may most probably exist in the catalyst as phosphate or polyphosphate. All the metals and the promoters can be deposited in any order on the carrier, either in a single step or in multiple steps via solid state techniques or solution impregnation from aqueous or non-aqueous media, with heat treatments in between.

The chromium and/or molybdenum together can constitute from 1 to 20% by weight, expressed as elemental chromium or molybdenum, based on the final catalyst weight. The preferred range is 5–18% by weight, say about 12% by weight. The tungsten can constitute 1–50% by weight, preferably 10–45% by weight, say about 37% wt %, expressed as elemental tungsten, based on the final catalyst weight. Tungsten is the preferred Group VIB metal.

The non-noble Group VIII metal may preferably be one or more metals selected from cobalt, iron or nickel. The final catalyst can constitute 0.1–1 5% by weight selected from one or more of nickel, cobalt and iron. The preferred range for one or more metals selected from nickel, iron or cobalt is from 2 to 12% by weight, say about 7 wt. %, expressed as elemental cobalt, iron or nickel, based on final catalyst weight. Nickel is the preferred non-noble Group VIII metal.

The Group VIB metal may be loaded onto the catalyst support from a preferably aqueous solution of ammonium metatungstate. The Group VIII non-noble metal may be loaded onto the catalyst support preferably from an aqueous solution of nickel nitrate hexahydrate.

In one embodiment employing a phosphorus promoter in the catalyst, the carbon pellet support is contacted with a phosphorus ammonium dihydrogen phosphate ($NH_4$) $H_2PO_4$, in total solution volume enough to fill the pores of the carbon support to incipient wetness. The support bearing the phosphorus compound is allowed to stand at room temperature for 0.5–4 hours, say 2 hours, and then heated at a rate of 0.3° C./min to 115° C. in air or nitrogen, maintained at that temperature for 2–48 hours, say 24 hours, and then cooled to room temperature over 2–6 hours, say 3 hours. Temperatures higher than 115° C. may be employed, but must be limited to less than 450° C. Multiple depositions may be employed to prepare catalysts with the desired phosphorus loading. The catalytic metals and additional promoters are then deposited on the carbon support already containing the phosphorus promoter.

Although the metals and phosphorus may be deposited on the catalyst support in any order, either in a single step or in multiple steps, it is preferred to deposit the phosphorus first, then the Group VIB metal and thereafter the non-noble Group VIII metal with a drying/calcining step between each loading. Alternatively, phosphorus may be deposited on the catalyst support along with the Group VIB metal in the first step.

It is believed that the added phosphorus promoter of this particular embodiment primarily exists in the final catalyst in most cases as phosphate or polyphosphate species. However, other phosphorus containing species are not excluded. Expressed as elemental phosphorus, it can exist in an amount of 0.01 to 10% by weight of the total catalyst and preferably about 0.1 to 5% by weight. In general, any inorganic, organic or organometallic phosphorus compounds can be used as precursors for phosphate in the final catalyst. Suitable phosphorus compounds include, but are not limited to ammonium dihydrogen phosphate, diammonium hydrogen phosphate, triethyl phosphate, aniline phosphate, urea phosphate, phosphoric acid, polyphosphoric acid, metaphosphoric acid, phosphorous pentoxide, phosphorus pentasulfide, phosphorus pentachloride, and pyrophosphoric acid.

In another preferred embodiment the "phosphorus treated carbon" support is characterized by the phosphorus existing predominantly as polyphosphate species bound to the carbon surface characterized by peaks between –5 and –30 ppm in the solid-state magic angle spinning $^{31}P$ nuclear magnetic resonance spectrum.

This "phosphorus treated activated carbon" is also prepared using an activated carbon precursor as a starting material, which may already contain a small amount of phosphorus or be phosphorus free. The "phosphorus treated carbon" support is prepared by incorporating one or more inorganic, organic or organometallic phosphorus compounds such as ammonium phosphates, alkyl phosphates, urea phosphates, phosphoric acid and phosphorus pentoxide into the activated starting material. Addition by impregnation of the activated carbon with solution can be carried out by dissolving the phosphorus based compound in a solvent and impregnating the carbon. Alternatively, the carbon material can be thoroughly mixed with the phosphorus-based compound in a solid or slurry state. Phosphorus can also be introduced into the carbon through vapor or gas phase, using suitable phosphorus compounds, at appropriate conditions. The activated carbon/phosphorus compound mixture is subjected to a heat treatment after impregnation. The heat treatment step requires subjecting the activated carbon/phosphorus compound mixture to a temperature from about 450° to about 1200° C. This heat treatment is considered critical as it is believed to convert most of the phosphorus to polyphosphate species bound to the carbon surface, which show characteristic peaks between –5 and –30 ppm in their $^{31}P$ magic angle spinning solid-state nuclear magnetic resonance spectrum. The peaks due to these phosphorus species also have characteristic spinning side-bands due to a large chemical shift anisotropy. The phosphorus level in the "phosphorus treated carbon" support of the catalysts of the present invention may range from about 0.1% to 10% by weight, measured as elemental phosphorus. The preferred range is between 2.5% and 10% phosphorus by weight in the support.

The carbon pellet support bearing the phosphate component is then contacted with an aqueous solution of a salt of the Group VIB metal, preferably ammonium metatungstate, $(NH_4)_6H_2W_{12}O_{40}$ in an amount to fill the pores to incipient wetness. The support bearing phosphorus and the Group VIB metals is typically allowed to stand at room temperature for 0.5–4 hours, say 2 hours, and then heated in air or inert atmosphere at a rate of say 0.3° C./min to 115° C., maintained at that temperature for 2–48 hours, say 24 hours, and then cooled to room temperature over 2–6 hours, say 3 hours. Temperatures higher than 115° C. may be employed, but are limited to about 500° C. Multiple impregnation may be employed to prepare catalysts with desired Group VIB metal loading.

The support containing phosphorus and Group VIB metal is contacted with an aqueous solution of the non-noble Group VIII metal, preferably nickel nitrate hexahydrate, in amount to fill the pores to incipient wetness. The support bearing phosphorus, Group VIB metal and Group VIII metal is typically allowed to stand at room temperature for 0.5–4 hours, say 2 hours, and then heated in air or inert atmosphere, at a rate of say 0.3° C./min to 115° C., maintained at that temperature for 2–48 hours, say 24 hours and then cooled to room temperature over 2–6 hours, say 3 hours. Temperatures higher than 115° C. may be employed, but are limited to about 500° C. Multiple impregnations may be employed to prepare catalysts with desired Group VIII metal loading.

The catalyst so prepared contains 1–50 wt %, preferably 5–18 wt %, say 12 wt %, of molybdenum or chromium of the Group VIB (measured as metal); 0.1–15 wt %, preferably 2–12 wt %, say 7 wt %, of Group VIII metal (measured as metal); and 0.01–10 wt %, preferably 0.1–5 wt %, say 3 wt % phosphorus (calculated as elemental phosphorus). When the VIB metal is the preferred tungsten, it may be present in amount of 1–50 wt %, preferably 10–45 wt % say 37 wt %.

When the carbon supported catalyst bears 0.001–10 wt % boron in addition to the Group VIII and Group VIB metals, optionally in addition to the phosphorus, the boron may be present in the final catalyst, calculated as metal, in an amount of 0.001–10 wt %, preferably 0.01–6 wt %, say 1 wt % of boron. The boron may be loaded onto the catalyst support from an inorganic, organometallic or organic compound of boron, by any method known to those skilled in the art. Examples of typical boron compounds which may be used as a source of boron include and are not limited to boric acid or salts containing boron typified by borates ($BO_3^{-3}$) or tetraborates ($B_4O_7^{-2}$), boron halides, $B_2O_3$ and other oxides, boron alkoxides such as tri-n-butylborate and tri-n-amylborate, complexes of borane with nitrogen, oxygen or sulfur compounds, complexes of $BF_3$, boranes, fluoroborates, triethanolamine borate, trimethoxy boroxine $(CH_3O)_3B_2O_3$, etc. The preferred compounds are boric acid, and ammonium salts including $(NH_4)_2B_4O_7$. Other Group IIIA metals may also be used as promoters, but boron is the preferred Group IIIA metal.

Although the metals and boron may be added in any order, either in single step or in multiple steps, it is preferred to deposit the boron first, then the Group VIB metal and thereafter the non-noble Group VIII metal with a drying/calcining step in between each loading. Alternatively, boron may be added along with the Group VIB metal in the first step.

Catalyst Sulfiding:

In a typical process according to the present invention, the carbon or "phosphorus treated carbon" supported catalyst containing Group VIB and non-noble Group VIII metals, and optionally phosphorus, and optionally boron is loaded into a hydrotreating reactor and sulfided in situ to convert the Group VIB and Group VIII metal compounds to their respective sulfides or oxysulfides, to a significant extent.

The sulfiding can be accomplished using any method known in the art such as for example, by heating in a stream of hydrogen sulfide in hydrogen or by flowing an easily decomposable sulfur compound such as carbon disulfide or dimethyl disulfide in a hydrocarbon solvent over the catalyst at elevated temperatures up to, but not limited to 450° C. at atmospheric or higher pressures, in the presence of hydrogen gas for 2–24 hours, say 3 hours.

Alternatively, the sulfiding can also be effected by the sulfur compounds present in the hydrocarbon charge itself which is being hydrotreated. The catalyst can also be pre-sulfided outside the reactor, suitably passivated and then loaded into the reactor. After sulfiding, the hydrocarbon charge is passed through the catalyst bed together with hydrogen gas at pressures ranging from 200–3,000 psi and temperatures ranging from 200–450° C. at liquid hourly space velocities (LHSV) ranging from 0.1 to 10. Pure hydrogen gas or recycle gas containing largely hydrogen can be used at flow rates ranging from 200–10,000 SCFB.

Ex-situ sulfiding can be accomplished using any of the known techniques described in literature. If sufficient amount of sulfur is incorporated into the catalyst using one of these ex-situ presulfiding techniques, activation of the catalyst may be accomplished by heating the catalyst in hydrogen flow in the reactor itself.

The process of the invention could be used as a means of pretreatment in any hydrocracking process or FCC process known in the art. The following experimental uses are given only in the way of illustration and are not intended to limit the invention in any way.

Experimental:

Experiments were performed using a hydrotreating catalyst and a hydrocracking catalyst loaded in two reactors in series, simulating a commercial Series Flow Hydrocracking unit. Equal volumes of the catalysts were loaded within each respective reactor with inert alpha alumina material above and below to fill the reactor void space. The reactors were placed in multizone heaters and piped together such that hydrogen and oil feed could be metered upflow into the hydrotreating reactor, the total effluent from which is directed into the hydrocracking reactor. Additional hydrogen was added at the inlet to the hydrocracking reactor, and the mixture proceeded upflow through the reactor. The gas and liquid products were separated upon exiting the hydrocracking reactor, and the amount and composition of each was determined.

The catalysts were activated prior to the introduction of charge stock by sulfiding at 350° C. using a gas containing 10% hydrogen sulfide in hydrogen. Then the reactor charge stock consisting of a mixture of 35 vol. % Light Cycle Gas Oil (LCGO) and 65 vol. % Delayed Coker Gas Oil, was introduced into the reactor along with hydrogen, and the temperatures and pressures were adjusted to the desired processing conditions. The properties of the hydrocarbon feed are presented in Table-1. The gas oil charge stock was metered into the reactor at 1.7 volumes/hour/volume of hydrotreating catalyst. The liquid hourly space velocity (LHSV) with respect to the hydrocracking catalyst was also 1.7 vol/hr/vol catalyst. The hydrogen flow-rate into the hydrotreating reactor was 3,000 SCFB and an additional 2,500 SCFB hydrogen was added to the hydrocracking reactor. The total unit pressure was maintained at 1,350 psig.

Since the hydrocracking catalyst was initially very active, for good temperature control, temperatures were gradually increased to the desired temperature during the first 24 hours of charge stock flow. After 42 hours, when the reactor temperatures had been at the desired steady state for 18 hours, the first product samples, gas and liquid, were collected. Then, temperatures were adjusted to the next process condition, and after 18 hours at the new temperatures a second set of samples were collected. This procedure was repeated again to achieve product samples at each of three temperature conditions for each of the hydrotreating catalysts.

The gas sample was sent to an on-line gas chromatograph where the components and concentrations in the gas product were determined. This data was used for product analysis, and with the amounts of liquid and gas measured in and out of the reactor, were used to calculate the material balance for each condition of the experiments. The calculations showed 95% to 98% of the feed material was recovered during the sampling periods.

The liquid product samples contained dissolved hydrogen sulfide and ammonia, which were removed prior to analyses. The liquid product was then analyzed for aromatics content by Supercritical Fluid Chromatography (SFC) D5186, for boiling point distribution by method D2887, and for density by method D1298. The remaining liquid product was then separated into two fractions boiling approximately above and below 400° F. The fraction boiling above 400° F. was referred to as the diesel cut and the fraction boiling below 400° F. was referred to as the naphtha cut.

The naphtha cut was analyzed for composition by the PIONA GC method and for boiling point distribution by the D2887 method. The PIONA method (Paraffins, Isoparaffins, Olefins, Naphthenes, and Aromatics) is a well known method to those skilled in the art. The diesel cut was analyzed for aromatics by SFC, for boiling point distribution by method D2887, and for sulfur and nitrogen content by X-ray fluorescence (D2622) and Chemiluminescence methods respectively.

EXAMPLE 1

The hydrotreating catalyst used in the first reactor was a Ni-W catalyst supported on a "phosphorus treated activated carbon" containing a nominal 37 wt % tungsten and 7.5 wt % nickel. The carbon support contained approximately 14 wt % $H_3PO_4$ equivalent of phosphorus before the metals deposition. The catalyst was prepared using the procedure given in U.S. Pat. No. 5,462,651 and allowed Ser. No. 08/441,897We shall refer to this catalyst as "Catalyst C1". The hydrocracking catalyst used in the second reactor was a commercially available zeolite and silica—alumina supported Ni—Mo catalyst, available under the trade name of Z-763 from the Criterion Catalyst Company.

The hydrocracking reactor temperature was kept constant at 379°–380° C. throughout the experiment, but the hydrotreating catalyst was operated at three different temperatures of 372° C., 382° C. and 390° C. The experimental procedure given above in "experimental" was followed.

Comparative Example 2

The hydrotreating catalyst used in the first reactor was a high HDN activity alumina supported Ni—Mo—P catalyst available under the trade name of DN-120 from the Criterion Catalyst Company. The hydrocracking catalyst used in the second reactor was the commercially available Z-763, from the Criterion Catalyst Company.

In this experiment also, the hydrocracking reactor temperature was kept constant at 379°–380° C. throughout the experiment, but the hydrotreating catalyst was operated at three different temperatures of 372° C., 382° C. and 390° C. The experimental procedure given above in "experimental" was followed.

The experimental results obtained are presented in Tables 2, 3 and 4. In each table, the API gravity of the entire liquid product, % of product distilled off at 350° F., the temperature at which 90% of the liquid product is distilled off, and the weight % aromatics in the total liquid product are presented.

TABLE 2

Effect of Hydrotreating Catalyst on Hydrocracking Product
[Total Liquid product]
Catalysts in Separate Reactors, in Series, with Inter-stage Hydrogen Addition.
LHSV = 1.7; $H_2$ flow = 3000 SCFB for Hydrotreater, balance plus 2500 SCFB make-up for Hydrocracker;
Total Pressure = 1350 psig
Hydrotreater at 372° C., Hydrocracker at 379° C.

| Hydrotreating Catalyst | Catalyst C1 | DN-120 |
| --- | --- | --- |
| API Gravity | 47.4° | 43.1° |
| D2887, wt. % distilled at 350° F. | 38 | 28 |
| D2887, Temp. for 90% distilled | 547° F. | 590° F. |
| Aromatics in product, wt % | 14.0 | 22.5 |

TABLE 3

Effect of Hydrotreating Catalyst on Hydrocracking Product
[Total liquid product]
Catalysts in Separate Reactors, in Series, with Inter-stage Hydrogen Addition.
LHSV = 1.7; $H_2$ flow = 3000 SCFB for Hydrotreater, balance plus 2500 SCFB make-up for Hydrocracker;
Total Pressure = 1350 psig
Hydrotreater at 382° C., Hydrocracker at 380° C.

| Hydrotreating Catalyst | Catalyst C1 | DN-120 |
| --- | --- | --- |
| API Gravity | 49.3° | 44.9° |
| D2887, wt. % distilled at 350° F. | 42 | 32 |
| D2887, Temp. for 90% distilled | 529° F. | 578° F. |
| Aromatics in product, wt % | 13.2 | 20.3 |

TABLE 4

Effect of Hydrotreating Catalyst on Hydrocracking Product
[Total liquid product]
Catalysts in Separate Reactors, in Series, with Inter-stage Hydrogen Addition.
LHSV = 1.7; $H_2$ flow = 3000 SCFB for Hydrotreater, balance plus 2500 SCFB make-up for Hydrocracker;
Total Pressure = 1350 psig
Hydrotreater at 390° C., Hydrocracker at 379° C.

| Hydrotreating Catalyst | Catalyst C1 | DN-120 |
| --- | --- | --- |
| API Gravity | 48.2° | 44.1° |
| D2887, wt. % distilled at 350° F. | 39 | 29 |
| D2887, Temp. for 90% distilled | 545° F. | 585° F. |
| Aromatics in product, wt % | 13.3 | 19.8 |

The wt % gas make ($C_1$-$C_4$ hydrocarbons), the wt % isobutane produced, wt % naphtha boiling below 400° F. in the product, naphtha API gravity, wt % naphtha aromatics, wt % diesel or middle distillate boiling between 400° F. and 600° F. in the product, wt % material boiling above 600° F., diesel fraction API gravity, sulfur content of the diesel fraction, nitrogen content of the diesel fraction, and the aromatic content of the diesel fraction, observed at the second and third reaction conditions are presented in Tables 5 and 6 respectively.

TABLE 5

Effect of Hydrotreating Catalyst on Hydrocracking Product
[Total product including gaseous products]
Catalysts in Separate Reactors, in Series, with Inter-stage Hydrogen Addition.
LHSV = 1.7; $H_2$ flow = 3000 SCFB for Hydrotreater, balance plus 2500 SCFB make-up for Hydrocracker;
Total Pressure = 1350 psig
Hydrotreater at 382° C., Hydrocracker at 379° C.

| Hydrotreating Catalyst | Catalyst C1 | DN-120 |
|---|---|---|
| Wt % $C_1$-$C_4$ (gas make) | 3.9 | 2.3 |
| wt. % isobutane | 1.8 | 1.0 |
| wt. % Naphtha produced (boiling below 400° F., by D86 distillation) | 59.0 | 47.2 |
| Naphtha API Gravity | 53.4° | 50.9° |
| Naphtha Aromatics (wt. %) by SFC | 11.9 | 15.3 |
| Wt. % Diesel produced (boiling between 400–600° F., by D86 distillation) | 34.9 | 43.9 |
| wt. % boiling >600° F. | 2.2 | 6.6 |
| Diesel API Gravity | 41.3° | 38.9° |
| Diesel sulfur (wt. ppm) | 21 | 56 |
| Diesel nitrogen (wt. ppm) | <5 | <5 |
| Diesel Aromatics (wt. %) by SFC | 14.7 | 21.5 |

TABLE 6

Effect of Hydrotreating Catalyst on Hydrocracking Product
[Total product including gaseous products]
Catalysts in Separate Reactors, in Series, with Inter-stage Hydrogen Addition.
LHSV = 1.7; $H_2$ flow = 3000 SCFB for Hydrotreater, balance plus 2500 SCFB make-up for Hydrocracker;
Total Pressure = 1350 psig
Hydrotreater at 390° C., Hydrocracker at 380° C.

| Hydrotreating Catalyst | Catalyst C1 | DN-120 |
|---|---|---|
| wt. % $C_1$-$C_4$ (gas make) | 4.0 | 2.3 |
| wt. % isobutane | 1.8 | 0.9 |
| wt. % Naphtha produced (boiling below 400° F., by D86 distillation) | 54.9 | 47.2 |
| Naphtha API Gravity | 53.0° | 50.4° |
| Naphtha Aromatics (wt. %) by PIONA analysis | 12.1 | 14.9 |
| Wt. % Diesel produced (boiling between 400–600° F., by D86 distillation) | 37.8 | 43.4 |
| wt. % boiling >600° F. | 3.3 | 7.1 |
| Diesel API Gravity | 40.8° | 38.6° |
| Diesel sulfur (wt. ppm) | 10 | 28 |
| Diesel nitrogen (wt. ppm) | <5 | <5 |
| Diesel Aromatics (wt. %) by SFC | 14.7 | 20.8 |

EXAMPLE 3

In this experiment, the hydrotreating reactor temperature was maintained at 390° C., but the temperature of the hydrocracking reactor was lowered to 367° C., instead of 379–380 C. The catalysts used and all the other process conditions are identical to those used for Example 1. Results from this experiment, presented in Table 7 and Table 8, show that the hydrocracking reactor temperature can be adjusted to produce the desired product ratios, especially of gasoline and diesel.

TABLE 7

Effect of Hydrotreating Catalyst on Hydrocracking Product
[Total Liquid Product]
Catalysts in Separate Reactors, in Series, with Inter-stage Hydrogen Addition.
LHSV = 1.7; $H_2$ flow = 3000 SCFB for Hydrotreater, balance plus 2500 SCFB make-up for Hydrocracker;
Total Pressure = 1350 psig
Catalyst C1 in Hydrotreating Reactor

| | Hydrotreater at 390° C., Hydrocracker at 380° C. | Hydrotreater at 390° C., Hydrocracker at 367° C. |
|---|---|---|
| API Gravity | 48.2° | 39.4° |
| D2887, wt. % distilled at 350° F. | 39 | 18 |
| D2887, Temp. for 90% distilled | 545° F. | 628° F. |
| Aromatics in product, wt % | 13.3 | 17.9 |

TABLE 8

Effect of Hydrotreating Catalyst on Hydrocracking Product
[Total product including gaseous products]
Catalysts in Separate Reactors, in Series, with Inter-stage Hydrogen Addition.
LHSV = 1.7; $H_2$ flow = 3000 SCFB for Hydrotreater, balance plus 2500 SCFB make-up for Hydrocracker;
Total Pressure = 1350 psig
Catalyst C1 in Hydrotreating reactor

| | Hydrotreater at 390° C., Hydrocracker at 380° C. | Hydrotreater at 390° C., Hydrocracker at 367° C. |
|---|---|---|
| wt. % $C_1$-$C_4$ (gas make) | 4.0 | 1.2 |
| wt. % isobutane | 1.8 | 0.3 |
| wt. % Naphtha produced (boiling below 400° F., by D86 distillation) | 54.9 | 28.4 |
| Naphtha API Gravity | 53.0° | 47.0° |
| Naphtha Aromatics (wt. %) by PIONA analysis | 12.1 | 20.4 |
| Wt. % Diesel produced (boiling between 400–600° F., by D86 distillation) | 37.8 | 56.3 |
| wt. % boiling >600° F. | 3.3 | 14.1 |
| Diesel API Gravity | 40.8° | 36.7° |
| Diesel sulfur (wt. ppm) | 10 | 12 |
| Diesel nitrogen (wt. ppm) | <5 | <5 |
| Diesel Aromatics (wt. %) by SFC | 14.7 | 18.0 |

In order to conclusively demonstrate that the significantly improved hydrocracker conversion and product quality by the use of high HDN/HDAr activity catalysts in the hydrotreating reactor prior to the hydrocracking reactor is responsible for the improved hydrocracker conversion and the improved product quality, at the end of Example 1 and at the end of Comparative Example 2, the effluent from the hydrotreating reactor was sampled and analyzed for aromatics conversion. Results obtained are presented in Table 9.

TABLE 9

Demonstration of Improved Aromatics Saturation in the Hydrotreating Reactor

For all reaction conditions:
Total pressure = 1350 psig
LHSV = 1.7
Hydrogen flow rate = 3000 SCFB % Aromatics Saturation (by SFC)

| Reaction Temperature (°C.) | Catalyst C1 in Hydrotreater | DN-120 Catalyst in Hydrotreater |
|---|---|---|
| 370 | 34.0 | 15.3 |
| 380 | 39.6 | 19.4 |
| 388 | 38.3 | 23.0 |
| 400 | 40.3 | 25.9 |

We believe that the data provided in this application, together with the data provided in U.S. Pat. Nos. 5,462,651, 5,389,241, 5,435,907, 5,500,401, 5,472,595, and 5,449,452 and Ser. Nos. 08/498,861, 08/441,897, and 08/425,547, is sufficient to conclude the following:

(a) Use of the carbon supported catalysts of U.S. Pat. Nos. 5,462,651, 5,389,241, 5,500,401, 5,472,595, and U.S. Pat. No. 5,449,452 and Ser. No. 08/498,861 now U.S. Pat. No. 5,556,824, Ser. No. 08/441,897, now U.S. Pat. No. 5,529,968, and Ser. No. 08/425,547 now abandoned for the catalytic hydrotreatment of the hydrocarbon oil feed prior to hydrocracking would have a multitude of benefits including significantly higher hydrocracker conversion, and improved product value and quality. As explained, a number of operational and economic benefits can be realized by implementing the process of present invention.

We claim:

1. An improvement in a process for hydrocracking a hydrocarbon oil feedstock containing sulfur and nitrogen compounds and aromatics into lighter lower boiling products comprising:

a) charging said hydrocarbon oil feedstock and hydrogen to one or more fixed bed hydrocracking zones in one or more hydrocracking reactors containing a hydrocracking catalyst at hydrocracking conditions to produce a lighter hydrocracked product stream;

the improvement comprising:

b) passing said feedstock prior to the hydrocracking, along with hydrogen, through one or more pretreatment zones for pretreatment; and c) contacting said feedstock in said pretreatment zones at a temperature of about 200° C. to 450° C. and a pressure of about 200–300 psig for pretreatment with a sulfided catalyst comprising one or more metals of non-noble Group VIII and one or more metals of Group VIB and optionally one or more elements selected from Group IIIA and Group VA of the Periodic Table, on a carbon support selected from the group consisting essentially or activated carbon find carbon support treated with phosphorous, said support having a BET (Brunauer-Emmett-Teller) surface area greater than 100 m²/g, an average Pore Diameter greater than 12Å and a Total Pore Volume greater than 0.3 cc/g.

2. The process of claim 1 wherein the activated carbon supported catalyst comprises:

i) 1–50 wt % of Group VIB metal; and ii) 0.1–15 wt % of non-noble Group VIII metal; and optionally iii) 0.001–10 wt % of an element selected from Group IIIA; and optionally iv) 0.01–10 wt % of phosphorus.

3. The process of claim 2 wherein the non-noble Group VIII metal is nickel.

4. The process of claim 2 wherein the Group VIB metal is selected from the group consisting of molybdenum and tungsten.

5. The process of claim 2 wherein the Group IIIA metal is boron.

6. The process of claim 2 wherein the carbon supported catalyst contains 10 to 45% by weight tungsten and, optionally 1 to 18% by weight of at least one of chromium or molybdenum.

7. The process of claim 2 wherein said Group VIII metal consists essentially of 2 to 12% by weight nickel and, optionally 2 to 12% by weight of one or more metals selected from cobalt and iron.

8. The process of claim 1 wherein the Average Pore Diameter of the carbon support is between 12Å and 100Å.

9. The process of claim 6 wherein the Average Pore Diameter is between 16Å and 50Å.

10. The process of claim 1 wherein the Total Pore Volume of the carbon support is 0.3 to 1.2 cc/g.

11. The process of claim 1 wherein said carbon support exists in a form selected from powder, granules, pellets, pills, spheres, fibers, monolith, foams, or extrudates.

12. The process of claim 11 wherein said carbon support is a carbon extrudate.

13. The process of claim 1 wherein said activated carbon support is characterized by a B.E.T. surface area of 100 to 2000 m²/g.

14. The process of claim 11 wherein said activated carbon support is characterized by a B.E.T. surface area of 600 to 1600 m²/g.

15. The process of claim 13 wherein the activated carbon support is characterized by a surface area of 900–1600 m²/g.

16. The process of claim 1 wherein said activated carbon support contains a Group VA element.

17. The process of claim 1 wherein the carbon supported catalyst contains 0.01–10% by weight of a Group VA element comprising phosphorus.

18. The process of claim 17 wherein the carbon supported catalyst contains 0.1 to 5% by weight phosphorus.

19. The process of claim 1 wherein the carbon support is characterized by 20 to 80% of the pore volume in pores of 20–500Å diameter.

20. The process of claim 1 wherein the activated carbon support is treated with phosphorus.

21. The process of claim 20 wherein the "phosphorus treated carbon" support is characterized by:

a) having been prepared by heat treating mixtures of activated carbons and phosphorus compounds at temperatures greater than 450° C. and up to 1,200° C.;

b) the phosphorus existing in the phosphorus treated carbon being bound to the carbon surface predominantly as polyphosphate species characterized by peaks between −5 and −30 ppm in the solid state magic angle spinning $^{31}P$ nuclear magnetic resonance spectrum.

22. The process of claim 21 wherein the Average Pore Diameter of the phosphorus treated carbon support is between 12Å and 100Å.

23. The process of claim 21 wherein the Total Pore Volume of the phosphorus treated carbon support is 0.3 to 1.2 cc/g.

24. The process of claim 21 wherein said phosphorus treated carbon support exists in a form selected from powder, granules, pellets, pills, spheres, fibers, monolith, foams, or extrudates.

25. The process of claim 24 wherein said phosphorus treated carbon support is a carbon extrudate.

26. The process of claim 21 wherein said phosphorus treated activated carbon support is characterized by a B.E.T. surface area of 100 to 2000 m²/g.

27. The process of claim 26 wherein said phosphorus treated activated carbon support is characterized by a B.E.T. surface area of 600 to 1600 m²/g.

28. The process of claim 26 wherein said phosphorus treated activated carbon support is characterized by a surface area of 900 to 1600 m²/g.

29. The process of claim 1 wherein the "phosphorus treated carbon" supported catalyst comprises:
   i) 1–50 wt % of Group VIB metal; and
   ii) 0.1–15 wt % of non-noble Group VIII metal; and optionally
   iii) 0.001–10 wt % of an element selected from Group IIIA; and optionally
   iv) 0.01–10 wt % of phosphorus.

30. The process of claim 29 wherein the non-noble Group VIII metal is nickel.

31. The process of claim 29 wherein the Group VIB metal is selected from the group consisting of molybdenum and tungsten.

32. The process of claim 29 wherein the Group IIIA metal is boron.

33. The process of claim 22 wherein the Average Pore Diameter is between 16Å and 50Å.

34. The process of claim 29 wherein non-noble Group VIII metals are present in an amount of about 2 to 12% by weight, based on the final catalyst weight.

35. The process of claim 29 wherein the Group VIB metal is tungsten and is present in an amount of 10–45 wt %, based on the final catalyst weight.

36. The process of claim 29 wherein the Group VIB metal is at least one metal selected from molybdenum and chromium present in an amount of from 1% to 18% by weight, based on final catalyst weight.

37. The process of claim 29 wherein the catalyst contains about 0.001 to 2% by weight of fluorine in addition to Group VIII, Group VIB, and Group IIIA.

38. The process of claim 21 wherein the "phosphorus treated carbon" support contains 0.1 to 10% by weight phosphorus, measured as elemental phosphorus.

39. The process of claim 38 wherein the "phosphorus treated carbon" support contains 2.5 to 10% by weight phosphorus, measured as elemental phosphorus.

40. The process of claim 1 wherein the hydrocarbon oil feedstock contains greater than 0.5 wt % sulfur and 0.01–0.3 wt % nitrogen.

41. In a fluid catalytic cracking process comprising admixing a hydrocarbon charge stock containing sulfur and nitrogen compounds and aromatics with an FCC catalyst in the bottom section of a riser reactor, passing the mixture of the hydrocarbon charge stock and the catalyst through the riser, thereby volatilizing the hydrocarbon charge stock and effecting cracking thereof;

the improvement comprising:

prior to passing the hydrocarbon mixture through the reactor riser, passing said hydrocarbon mixture through a reactor pretreatment comprising contacting said hydrocarbon charge at a temperature of 200°–450° C. and a pressure of 200–3000 psig with a catalyst comprising a metal of non-noble Group VIII and Group VIB and optionally one or more elements selected from Group IIIA and Group VA of the Periodic Table, on a carbon support consisting essentially of a member selected from the group consisting of activated carbon and a carbon support treated with phosphorous, said support having a BET (Brunauer-Emmett-Teller) surface area of 100 m²/g.–2,000 m²/g, an average Pore Diameter of 12Å –100Å and a Total Pore Volume of 0.3 cc/g - 1.2 cc/g.

42. The process of claim 41 wherein the activated carbon supported catalyst comprises:
   i) 1–50 wt % of Group VIB metal; and
   ii) 0.1–15 wt % of non-noble Group VIII metal; and optionally
   iii) 0.001–10 wt % of an element selected from Group IIIA; and optionally
   iv) 0.01–10 wt % of phosphorus.

43. The process of claim 41 wherein the non-noble Group VIII metal is nickel.

44. The process of claim 42 wherein the carbon supported catalyst contains 10 to 45% by weight tungsten and, optionally 1 to 18% by weight of at least one of chromium or molybdenum.

45. The process of claim 42 wherein said Group VIII metal consists essentially of 2 to 12% by weight nickel and, optionally 2 to 12% by weight of one or more metals selected from cobalt and iron.

46. The process of claim 41 wherein the Group VIB metal is selected from the group consisting of molybdenum and tungsten.

47. The process of claim 41 wherein the Group IIIA metal is boron.

48. The process of claim 41 wherein the Average Pore Diameter of the activated carbon support is between 16Å and 50Å.

49. The process of claim 41 wherein said carbon support exists in a form selected from powder, granules, pellets, pills, spheres, fibers, monolith, foams, or extrudates.

50. The process of claim 49 wherein said carbon support is a carbon extrudate.

51. The process of claim 41 wherein said activated carbon support is characterized by a B.E.T. surface area of 600 to m²/g.

52. The process of claim 51 wherein the activated carbon support is characterized by a surface area of 900–1600 m²/g.

53. The process of claim 41 wherein said activated carbon support contains a Group VA element.

54. The process of claim 41 wherein the carbon supported catalyst contains 0.01–10% by weight of a Group VA element comprising phosphorus.

55. The process of claim 54 wherein the catalyst contains 0.1 to 5% by weight phosphorus.

56. The process of claim 41 wherein the carbon support is characterized by 20 to 80% of the pore volume in pores of 20–500 Å diameter.

57. The process of claim 41 wherein the activated carbon support is treated with phosphorus.

58. The process of claim 57 wherein the "phosphorus treated carbon" support is characterized by:
   a) having been prepared by heat treating mixtures of activated carbons and phosphorus compounds at temperatures greater than 450 C. and up to 1,200° C.;
   b) the phosphorus existing in the phosphorus treated carbon being bound to the carbon surface predominantly as polyphosphate species characterized by peaks between –5 and –30 ppm in the solid state magic angle spinning $^{31}$P nuclear magnetic resonance spectrum.

59. The process of claim 58 wherein the Average Pore Diameter of the phosphorus treated carbon support is between and 50Å.

60. The process of claim 58 wherein said phosphorus treated carbon support exists as powder, granules, pellets, pills, spheres, fibers, monolith, foams, or extrudates.

61. The process of claim 60 wherein said phosphorus treated carbon support is a carbon extrudate.

62. The process of claim 57 wherein said phosphorus treated activated carbon support is characterized by a B.E.T. surface area of 100 to 2000 m$^2$/g.

63. The process of claim 62 wherein said phosphorus treated activated carbon support is characterized by a B.E.T. surface area of 600 to 1600 m$^2$/g.

64. The process of claim 62 wherein said phosphorus treated activated carbon support is characterized by a surface area of 900 to 1600 m$^2$/g.

65. The process of claim 58 wherein the "phosphorus treated carbon" support contains 0.1 to 10% by weight phosphorus, measured as elemental phosphorus.

66. The process of claim 65 wherein the "phosphorus treated carbon" support contains 2.5 to 10% by weight phosphorus, measured as elemental phosphorus.

67. The process of claim 41 wherein the "phosphorus treated carbon" supported catalyst comprises:

i) 1–50 wt % of Group VIB metal; and ii) 0.1–15 wt % of non-noble Group VIII metal; and optionally iii) 0.001–10 wt % of an element selected from Group IIIA; and optionally iv) 0.01–10 wt % of phosphorus.

68. The process of claim 67 wherein the non-noble Group VIII metal is nickel.

69. The process of claim 67 wherein the Group VIB metal is selected from the group consisting of molybdenum and tungsten.

70. The process of claim 67 wherein the Group IIIA metal is boron.

71. The process of claim 67 wherein non-noble Group VIII metals are present in an amount of about 2 to 12% by weight, based on the final catalyst weight.

72. The process of claim 67 wherein the Group VIB metal is tungsten and is present in an amount of 10–45 wt % based on the final catalyst weight.

73. The process of claim 67 wherein the Group VIB metal is at least one metal selected from molybdenum and chromium present in an amount of from 1 wt % to 18 wt %, based on final catalyst weight.

74. The process of claim 67 wherein the catalyst contains about 0.001 to 2% by weight of fluorine in addition to Group VIII, Group VIB, and Group IIIA.

75. The process of claim 41 wherein the carbon support is prepared from any carbon with a B.E.T. surface area of more than 100 m$^2$/g derived from any raw material selected from the group consisting of coal, wood, peat, lignite, coconut shell, olive pits, synthetic polymers, coke, petroleum pitch, coal tar pitch, and hydrocarbons, and existing in any physical form selected from the group consisting of powder, pellets, granules, extrudates, fibers, monoliths, and spheres.

76. The process of claim 41 wherein the hydrocarbon oil feedstock contains greater than 0.5 wt % sulfur and 0.01–0.3 wt % nitrogen.

* * * * *